United States Patent
Fang et al.

(10) Patent No.: US 8,791,981 B2
(45) Date of Patent: Jul. 29, 2014

(54) BIT RATE CONTROL APPARATUS AND METHOD THEREOF

(71) Applicant: Quanta Computer Inc., Tao Yuan Shien (TW)

(72) Inventors: Chun-Hsiung Fang, Tao Yuan Shien (TW); Rong-Quen Chen, Tao Yuan Shien (TW); Chih-Yin Lin, Tao Yuan Shien (TW); Chih-Wei Tuan, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 165 days.

(21) Appl. No.: 13/646,884

(22) Filed: Oct. 8, 2012

(65) Prior Publication Data
US 2013/0113874 A1 May 9, 2013

(30) Foreign Application Priority Data

Nov. 7, 2011 (TW) .............................. 100140477 A (51) Int. Cl.
| H04N 7/15 | (2006.01) |
| H04N 7/12 | (2006.01) |
| H04N 11/02 | (2006.01) |
| H04N 11/04 | (2006.01) |
| H04N 7/26 | (2006.01) |

(52) U.S. Cl.
CPC ..... *H04N 19/00236* (2013.01); *H04N 19/0006* (2013.01); *H04N 7/15* (2013.01); *H04N 19/00327* (2013.01)
USPC ................... 348/14.08; 348/397.1; 348/419.1

(58) Field of Classification Search
USPC .......... 348/14.01, 14.08, 14.09, 384.1, 387.1, 348/397.1, 401.1, 419.1, E07.078, E07.083
See application file for complete search history.

(56) References Cited

U.S. PATENT DOCUMENTS

| 5,617,150 | A | * | 4/1997 | Nam et al. ..................... 348/700 |
| 6,937,653 | B2 | * | 8/2005 | Song et al. ............... 375/240.03 |
| 7,046,729 | B2 | * | 5/2006 | Yu et al. ................... 375/240.12 |
| 7,869,503 | B2 | * | 1/2011 | Haskell et al. ........... 375/240.03 |
| 8,441,517 | B2 | * | 5/2013 | Mihara ....................... 348/14.09 |
| 2005/0190835 | A1 | * | 9/2005 | Martins et al. ........... 375/240.03 |
| 2006/0104346 | A1 | * | 5/2006 | Li et al. .................... 375/240.01 |
| 2009/0316779 | A1 | * | 12/2009 | Fukuhara et al. ........ 375/240.02 |
| 2012/0082214 | A1 | * | 4/2012 | Horowitz et al. ........ 375/240.03 |
| 2013/0135427 | A1 | * | 5/2013 | Wu et al. .................... 348/14.09 |

FOREIGN PATENT DOCUMENTS

CN 100568949 12/2009

OTHER PUBLICATIONS

Taiwanese language office action dated Mar. 25, 2014.
English language translation of abstract of CN 100568949 (published Dec. 9, 2009).

* cited by examiner

*Primary Examiner* — Binh Tieu
(74) *Attorney, Agent, or Firm* — McClure, Qualey & Rodack, LLP (57) ABSTRACT

A bit rate control apparatus applied in a video conference system is provided. The apparatus has a bit rate recording unit, configured to update a current bit rate; a bit rate reducing unit, configured to receive at least one event parameter and the current bit rate, and determine whether an event flag corresponding to the event parameters occurs; and a bit rate increasing unit, configured to increase the current bit rate periodically, wherein when the event flag occurs, the bit rate reducing unit reduces the current bit rate.

20 Claims, 5 Drawing Sheets

BIT RATE CONTROL APPARATUS AND METHOD THEREOF

CROSS REFERENCE TO RELATED APPLICATIONS

This Application claims priority of Taiwan Patent Application No. 100140477, filed on Nov. 7, 2011, the entirety of which is incorporated by reference herein.

BACKGROUND OF THE INVENTION

1. Field of the Invention

The present invention relates to bit rate control, and in particular to a bit rate control apparatus and a bit rate control method thereof applied in a video conferencing system using TCP-friendly rate control.

2. Description of the Related Art

When a video conference is held by using a video conferencing system, the quality of the communication during the video conference may become significantly worse, such as freezed frame, mosaic-like block noise, network packet loss, video delay, asynchronization between video and acoustic signals, or frame dropping, if a fixed bit rate is used to perform video encoding and the video stream of the video conference is transmitted through the network. Therefore, there is a demand for a bit rate control apparatus applied in a video conferencing system to adjust the bit rate of video encoding for different network conditions, such that the aforementioned issues can be avoided and the quality of the video conference may become excellent.

BRIEF SUMMARY OF THE INVENTION

A detailed description is given in the following embodiments with reference to the accompanying drawings.

In an exemplary embodiment, a bit rate control apparatus applied in a video conference system is provided. The apparatus comprises a bit rate recording unit, configured to update a current bit rate; a bit rate reducing unit, configured to receive at least one event parameter and the current bit rate and determine whether an event flag corresponding to the event parameters occurs; and a bit rate increasing unit, configured to increase the current bit rate periodically, wherein when the event flag occurs, the bit rate reducing unit reduces the current bit rate.

In an exemplary embodiment, a bit rate control method applied in a bit rate control apparatus of a video conference system is provided. The bit rate control apparatus comprises a current bit rate, a cordon bit rate, over cordon bit rate times, and a number for increasing the cordon bit rate successfully, and the bit rate control apparatus performs the following steps of: receiving at least one event parameter, and determining whether an event flag corresponding to the event parameter occurs; and periodically increasing the current bit rate, wherein when the event flag occurs, reducing the current bit rate.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
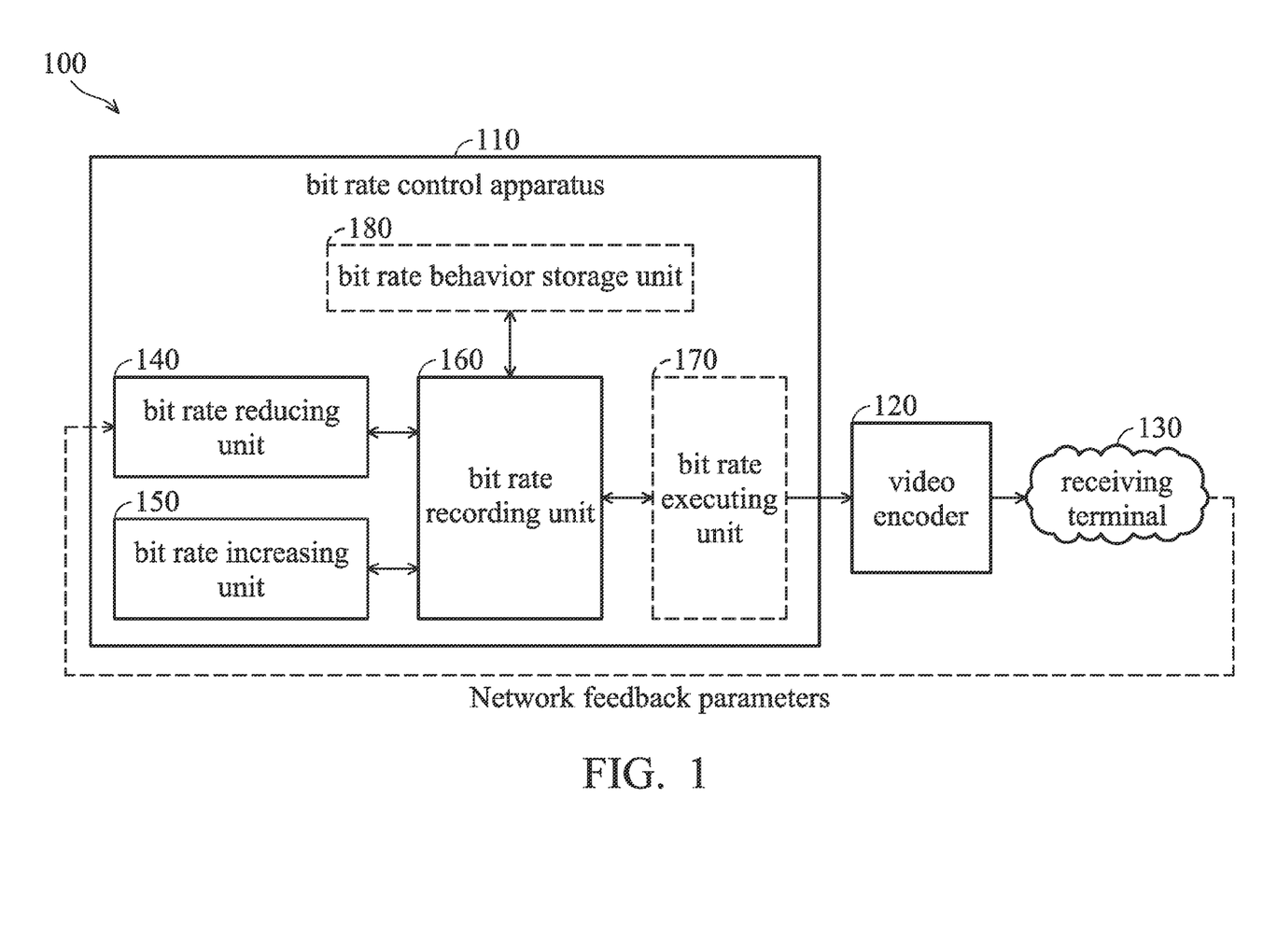
FIG. 1 illustrates a block diagram of the bit rate control system for video encoding according to an embodiment of the invention.

FIG. 1 illustrates a block diagram of the bit rate control system for video encoding according to an embodiment of the invention. The bit rate control system 100 may comprise the following modules: a bit rate control apparatus 110, a video encoder 120 and a receiving terminal 130. The bit rate control apparatus 110 is configured to generate a current bit rate to the video encoder 120. The video encoder 120 is configured to receive the current bit rate, and output a video stream (i.e. compatible with the video bit rate of the H.264 standard) according to the current bit rate. The receiving terminal 130 is configured to receive video signals from other terminals, obtain and transmit a plurality of network feedback parameters to the bit rate control apparatus 110 based on a report of TCP-friendly rate control to adjust the current bit rate dynamically. The network feedback parameter, for example, can be packet loss rate, or round-trip time.

The bit rate control apparatus 110 may comprise the following modules: a bit rate reducing unit 140, a bit rate increasing unit 150, and a bit rate recording unit 160. The bit rate reducing unit 140 is configured to receive the network feedback parameters, and determine whether to lower the current bit rate according to the received network feedback parameters. The bit rate increasing unit 150 is configured to increase the current bit rate periodically without being affected by the network feedback parameters, wherein the period for increasing the current bit rate can be adjusted. However, the bit rate increasing unit 150 may also refer to the bit rate information from the bit rate recording unit 160 (the details will be described later). The bit rate recording unit 160 is configured to dynamically update all the bit rate parameters and statuses, such as the current bit rate, a cordon bit rate, the number for increasing the cordon bit rate successfully, and the over cordon bit rate times.

The current bit rate is a recommended bit rate level generated by the bit rate control apparatus 110 by analyzing all the corresponding parameters. That is, the bit rate control apparatus 110 may regard the current bit rate as the bit rate level capable of performing the video conference smoothly, wherein the value of the current bit rate may vary due to the calculation of different conditions by the bit rate control apparatus 110, and then the current bit rate is transmitted to the video encoder 120. The video encoder 120 may encode the video signals of the video conference according to the received current bit rate. The cordon bit rate is a bit rate level set by the bit rate control apparatus 110 for indicating the undesired issues including freezed frame, mosaic-like block noise, network packet loss, video delay, asynchronization between video and acoustic signals, or frame dropping may occur. Therefore, it is better to limit the current bit rate under the cordon bit rate to prevent the aforementioned issues.

When the current bit rate is gradually increased to approach the cordon bit rate by the bit rate increasing unit 150, the current bit rate and the cordon bit rate should be adjusted according to a determination mechanism (i.e. steps S212 to S217 described later). If the determination mechanism is met, the cordon bit rate is increased, so that there is a larger margin for increasing the current bit rate to enhance the quality of the video conference, wherein the number for increasing the current bit rate successfully is increased by 1. The over cordon bit rate times indicate the number by which the current bit rate exceeds the cordon bit rate. The number for increasing the current bit rate successfully and the over cordon bit rate times are used in the aforementioned determination mechanism.

The bit rate recording unit 160 may update the current bit rate continuously, and transmit the updated current bit rate to a bit rate behavior storage unit 180. Also, the bit rate information recorded by the bit rate recording unit 160 can be referred to by the bit rate reducing unit 140 and the bit rate increasing unit 150.

In an embodiment, the bit rate control apparatus 110 may optionally comprise a bit rate executing unit 170. The bit rate executing unit 170 is configured to receive related bit rate information from the bit rate recording unit 160, and determine an output bit rate for the video encoder 120 according to the received bit rate information (e.g. the current bit rate) and at least one bit rate limitation factor. In other words, if the bit rate executing unit 170 is present, the video encoder 120 may perform video encoding according to the output bit rate generated by the bit rate executing unit 170. Otherwise, the video encoder 120 may perform video encoding according to the current bit rate generated by the bit rate recording unit 160.

The aforementioned bit rate limitation factor may comprise physical limitation factors (e.g. network bandwidth), rule limitation factors (e.g. bit rate limitations of the H.264 standard), and artificial limitation factors (e.g. the limit of the network circumstances set by telecommunications operators). For example, if the current bit rate is 6M bytes/sec and the maximum network bandwidth provided by the current network is 4M bytes/sec, freezed frame, mosaic-like block noise, network packet loss, video delay, asynchronization between video and acoustic signals, or frame dropping may occur during the transmission of the video stream when the video encoder 120 performs video encoding at the current bit rate. To prevent the aforementioned issues, the bit rate executing unit 170 may limit the current bit rate to fit the maximum network bandwidth of the network. That is, the bit rate executing unit 170 may reduce the current bit rate to 4M bytes from 6M bytes, wherein the reduced current bit rate is the output bit rate which is further transmitted to the video encoder 120.

Specifically, the bit rate executing unit 170 may pre-stores a maximum bit rate and a minimum bit rate, so that the current bit rate can be limited between the maximum bit rate and the minimum bit rate. The maximum bit rate and the minimum bit rate are determined according to at least one of the aforementioned bit rate limitation factors. As a result, when the current bit rate is larger than the maximum bit rate or smaller than the minimum bit rate, the bit rate executing unit 170 may limit the current bit rate between the maximum bit rate and the minimum bit rate.

In an embodiment, the bit rate control apparatus 110 may optionally comprise the bit rate behavior storage unit 180. The bit rate behavior storage unit 180 is configured to store the current bit rate and the cordon bit rate, and the recorded current bit rate and cordon bit rate may not vanish (i.e. non-volatile) when the bit rate control apparatus 110 shuts down. The bit rate behavior storage unit 180 may store the usage experience during the video conference to improve the adaptation of the bit rate. For example, the bit rate behavior storage unit 180 may record the current bit rate of the video conference between users A and B held on May 1. When the video conference between users A and B is held again on June 1, the bit rate executing unit 170 may set the current bit rate or the output bit rate by directly retrieving the recorded current bit of the video conference between users A and B held on May 1 from the bit rate behavior storage unit 180. The video encoder 120 may perform video encoding according to the retrieved current bit rate or the retrieved cordon bit rate, thereby quickly setting the initial parameters of the video conference.

Specifically, the bit rate reducing unit 140 may receive the network feedback parameters (e.g. the packet loss rate or the round-trip time) transmitted by the receiving terminal 130, and a buffer status (e.g. a buffer level, or the number of dropped frames) from the video encoder 120, wherein the packet loss rate, the round-trip time, the buffer level, or the number of dropped frames can be defined as event parameters. In an embodiment, the bit rate reducing unit 140 may determine whether the aforementioned four events occur, such as (a) whether the packet loss rate is larger than a packet loss threshold; (b) whether the round-trip time is larger than a round-trip time threshold; (c) whether the buffer level is higher than a buffer level high threshold; or (d) whether the number of dropped frames is larger than a dropped frame count threshold. When any one of the four events occurs, it may indicate that the network condition is not good. Subsequently, the bit rate reducing unit 140 may define the value of the current bit rate as the cordon bit rate to label the event parameter of the current bit rate. In addition, the bit rate reducing unit 140 may reduce the current bit rate simultaneously to lower the probability of the events to prevent the issues, such as freezed frame, mosaic-like block noise, network packet loss, video delay, asynchronization between video and acoustic signals, or frame dropping. As for the ways of reducing the current bit rate, the current bit rate can be multiplied by a decreasing amplification rate (e.g. the current bit rate*85%), decreased by a fixed value or fixed ratio, decreased in an exponential way, or reduced by other mathematical ways, but the invention is not limited thereto. After all, the bit rate recording unit 160 may update the reduced current bit rate and the reduced cordon bit rate, and transmit the reduced current bit rate and the reduced cordon bit rate to the bit rate behavior storage unit 180.

The bit rate increasing unit 150 may refer to the related bit rate information from the bit rate recording unit 160, such as the current bit rate, the cordon bit rate, the number for increasing the cordon bit rate successfully, and the over cordon bit rate times. The bit rate increasing unit 150 may periodically increase the current bit rate, and determine whether the increased current bit rate is larger than the cordon bit rate. For example, the current bit rate can be multiplied with an increasing amplification rate (e.g. the current bit rate*(1+10%))(i.e. the increasing amplitude is 10%), increased by a fixed value or a fixed ratio, increased in an exponential way, or increased in other mathematical ways, but the invention is not limited thereto. When the increased current bit rate is determined to exceed the cordon bit rate for the first time, the current bit rate is lowered and the over cordon bit rate times is increased by 1. As for the ways of lowering the current bit rate, the increased current bit rate can be restored to the level before the increment, but the invention is not limited thereto. In addition, if the over cordon bit rate times is larger than a predetermined number (e.g. 3 times), the bit rate increasing unit 150 may increase the cordon bit rate and keep the level of the increased current bit rate. In other words, the cordon bit rate and the current bit rate are increased simultaneously. Similarly, as for the ways of increasing the cordon bit rate, the cordon bit rate can be multiplied by a increasing amplification ratio (e.g. the cordon bit rate*(1+10%)) (i.e. the increasing amplitude is 10%), increased by a fixed number or a fixed ratio, increased in an exponential way, or increased by other mathematical methods, but the invention is not limited thereto.

Figure 2A:
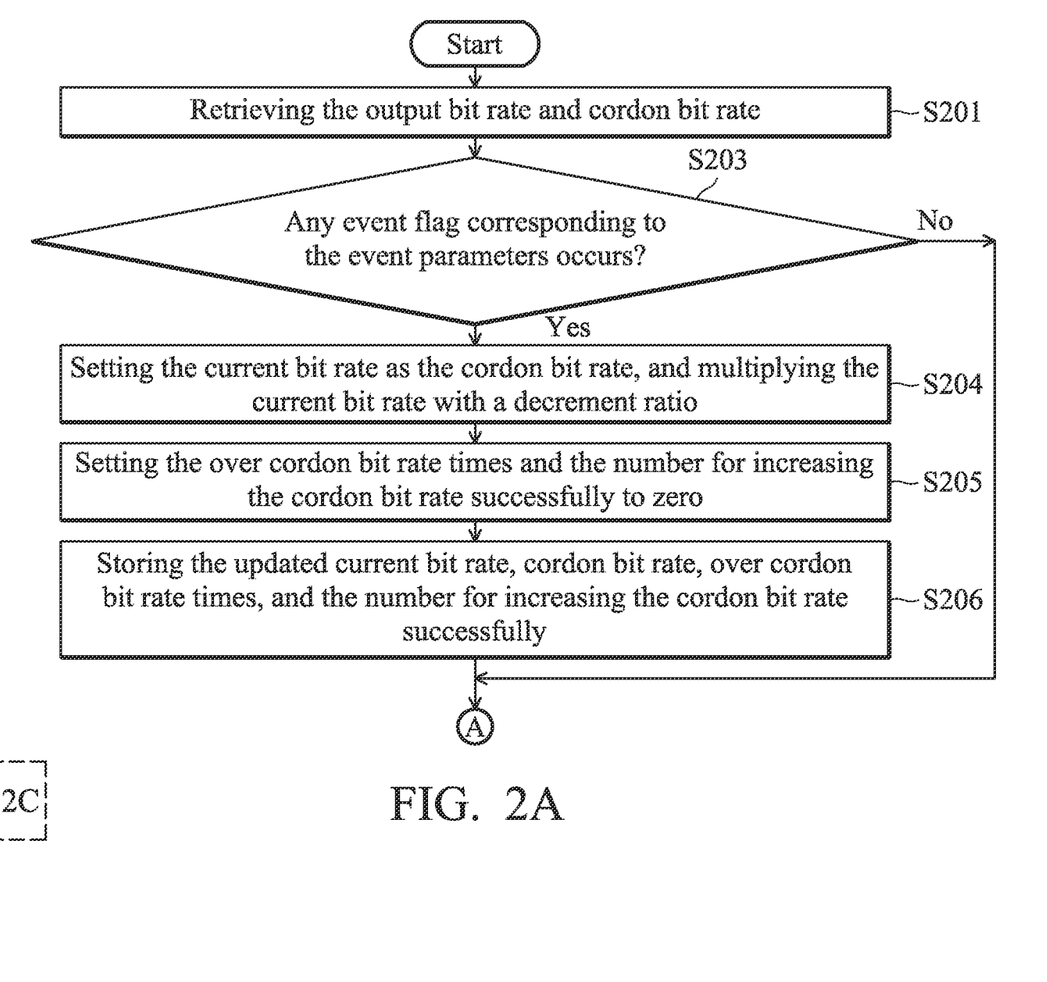
FIGS. 2A to 2C illustrate a flow chart of the bit rate control method according to an embodiment of the invention.
Figure 2B:
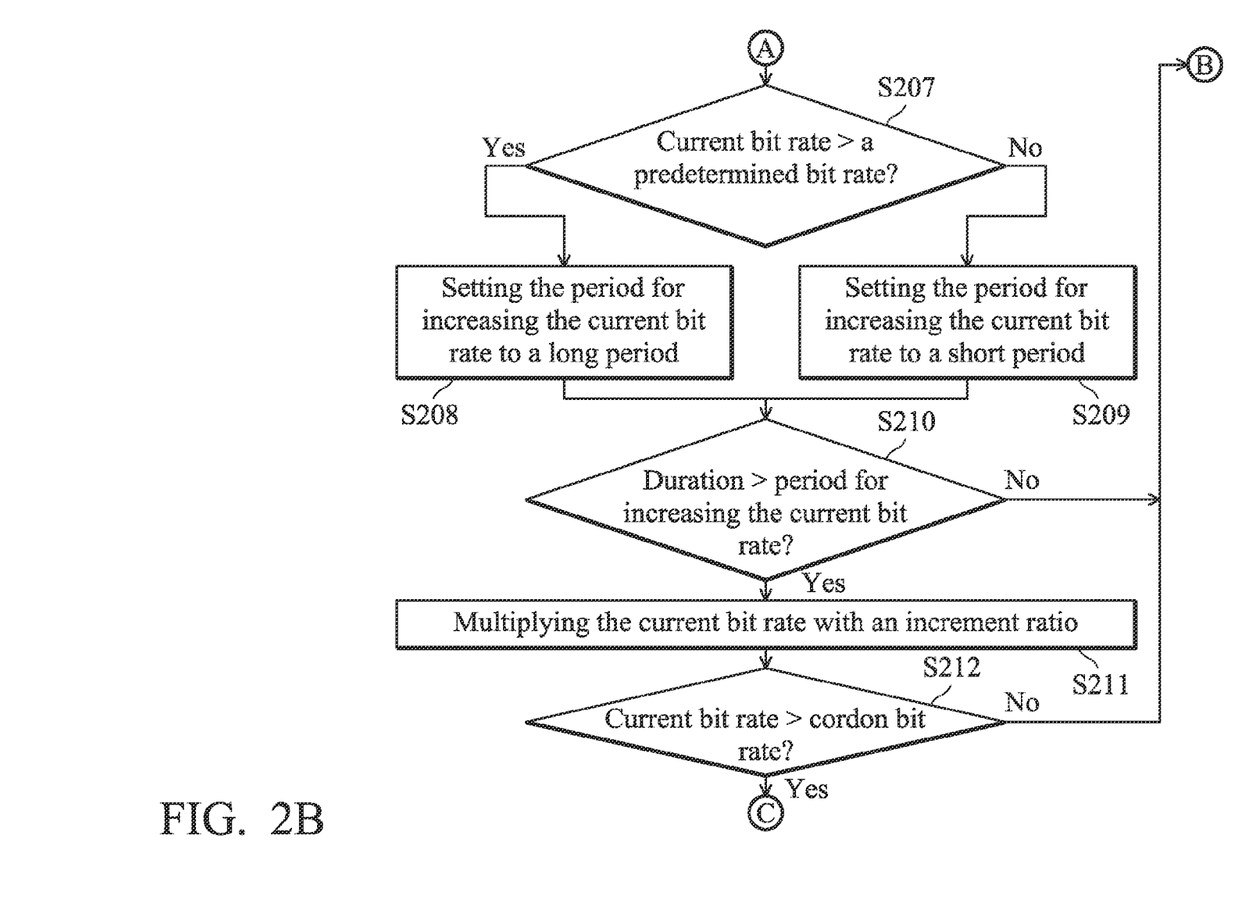
Figure 2C:
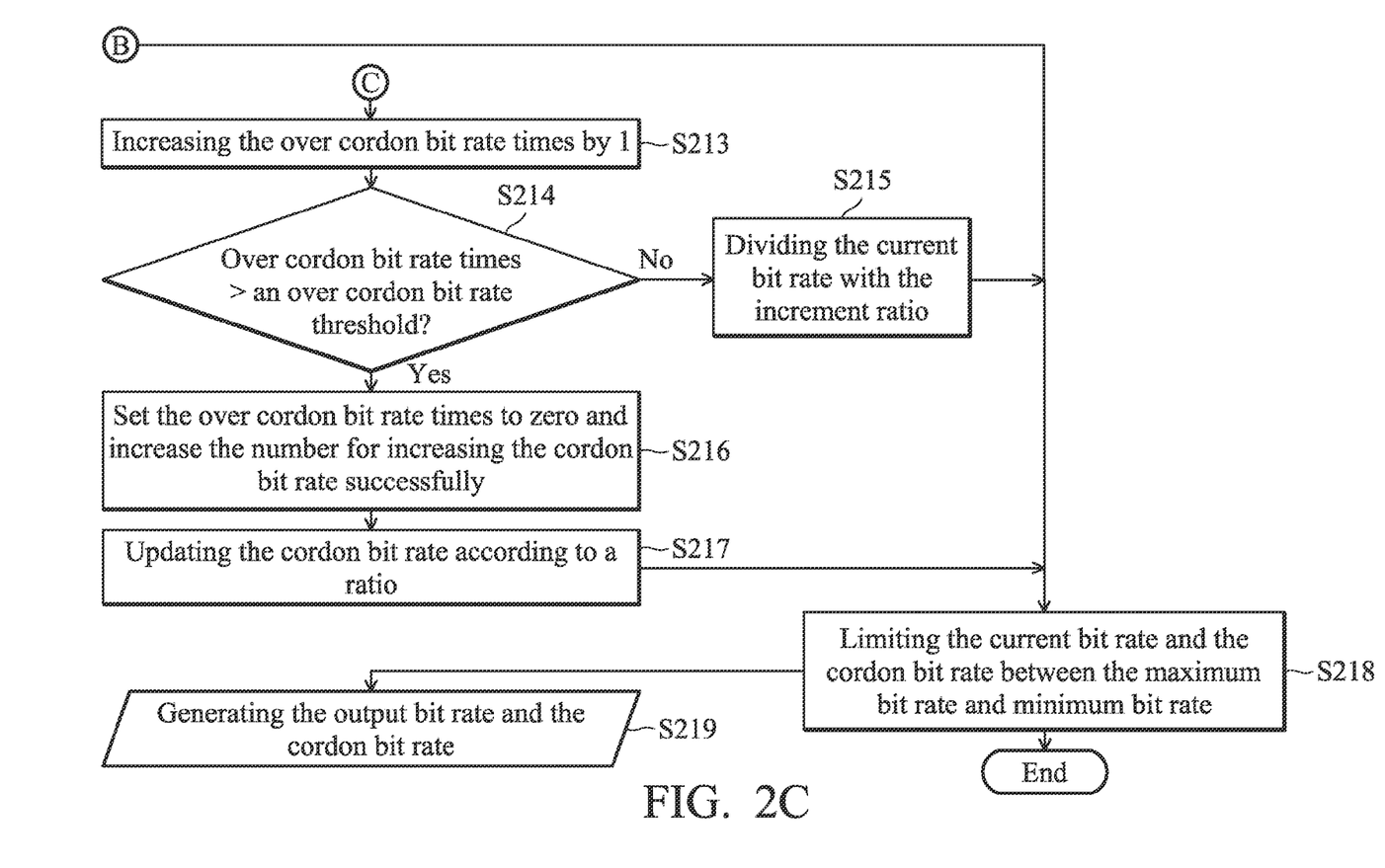
Figure 3:
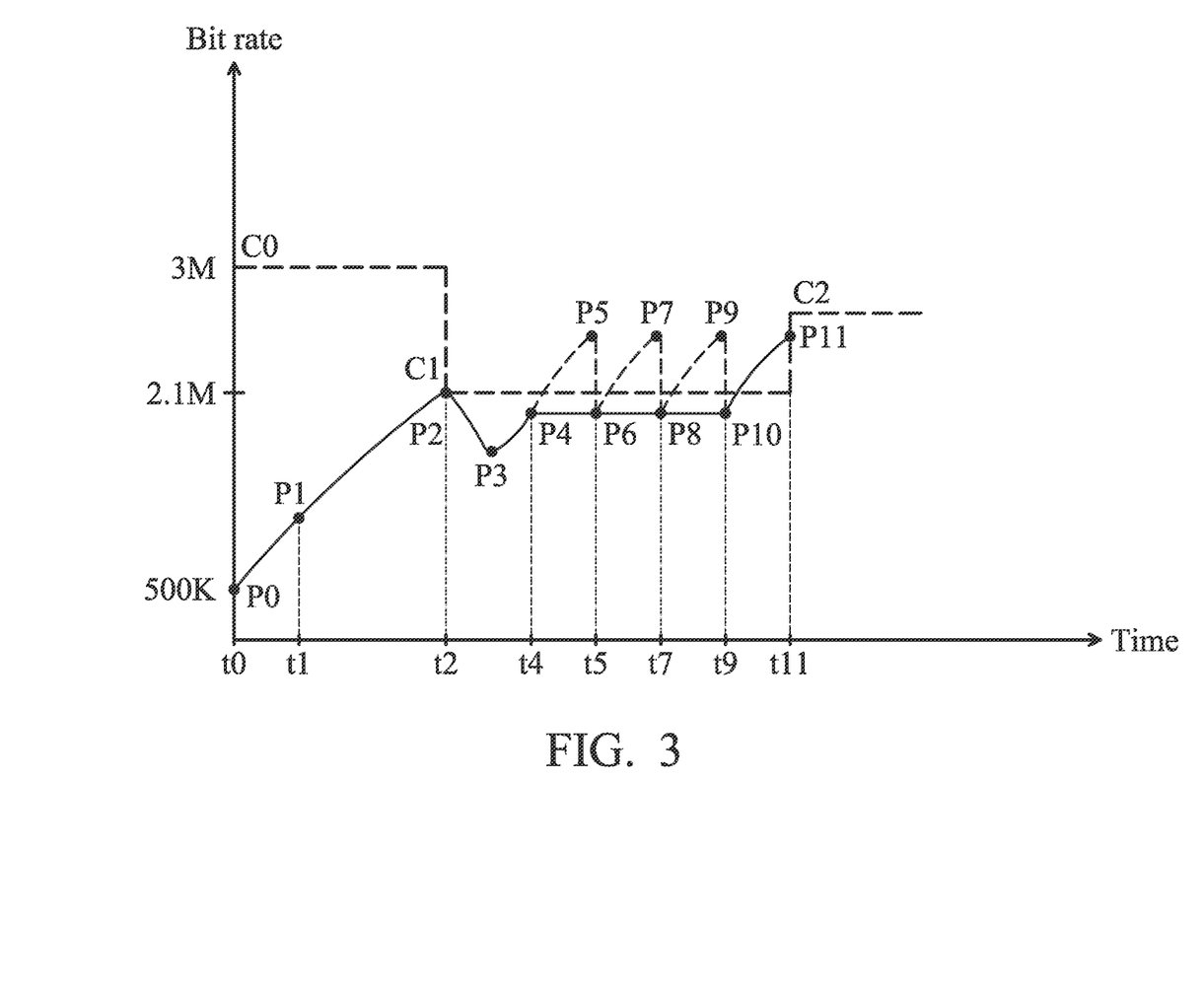
FIG. 3 illustrates a diagram of the bit rate control method according to an embodiment of the invention.

FIGS. 2A to 2C illustrate a flow chart of the bit rate control method according to an embodiment of the invention. FIG. 3 is a diagram of the bit rate control method according to an embodiment of the invention, wherein the vertical axis indicates the bit rate; the horizontal axis indicates time; the bold dashed line indicates the cordon bit rate; the solid line indicates the current bit rate; and the thin dashed line indicates the effect of the current bit rate caused by the determination mechanism.

In step S201, the bit rate recording unit 160 may continuously retrieve the output bit rate and the cordon bit rate from the bit rate executing unit 170, provide the output bit rate and the cordon bit rate to the bit rate reducing unit 140 and the bit rate increasing unit 150, and set the current time as the start time. It is noted that if the bit rate behavior storage unit 180 already stores a current bit rate and a cordon bit rate of the last video conference, the bit rate recording unit 160 may set the current bit rate and the cordon bit rate by directly retrieving the current bit rate and the cordon bit rate of the last video conference from the bit rate behavior storage unit 180 under an initial condition. In addition, if the bit rate control apparatus 110 is under the initial condition for the first time, there is no current bit rate and cordon bit rate of the last video conference and no output bit rate and cordon bit rate generated by the bit rate executing unit 170 either, the current bit rate and the cordon bit rate can be preset as a default setting. For example, the default current bit rate can be 500K bytes/sec (P0), and the default cordon bit rate can be 3M bytes/sec (C0).

In step S203, the bit rate reducing unit 140 may determine whether any event flag corresponding to the aforementioned event parameters (a)~(d) occurs. If so, it may indicate that the network condition is not good, and step S204 is performed. If not, step S207 is performed to increase the current bit rate periodically.

Specifically, step S207 is performed when the condition in step S203 does not occur. Since no event flag of the event parameters is set, it may indicate that the video conference can be held smoothly under the present current bit rate and the network condition is excellent. Thus, the bit rate control apparatus 110 may gradually increase the current bit rate to improve the quality of the video conference. First, the bit rate increasing unit 150 may determine whether the current bit rate is larger than a predetermined bit rate. If so, step S208 is performed. Otherwise, step S209 is performed. In step S208, the bit rate recording unit 160 may try to set the period for increasing the current bit rate as a long period. In step S209, the bit rate recording unit 160 may try to set the period for increasing the current bit rate as a short period.

The purpose of steps S207 to S209 is that when the current bit rate is above a certain level, human eyes cannot perceive significant differences between the encoded picture with increased current bit rate and encoded picture without increased current bit rate (i.e. the current bit rate). Thus, when the current bit rate is above a certain level, the frequency of increasing the current bit rate can be slowed down. That is, the current bit rate is increased after a relatively longer time, and thus the period for increasing the current bit rate can be set as a long period (step S208). Conversely, when the current bit rate is under a certain level (e.g. the default current bit rate is 500K bytes/sec after booting up), human eyes may perceive a significant improvement of the picture when the video conference is encoded with a slightly increased current bit rate.

Thus, the frequency of increasing the current bit rate can be increased. That is, the current bit rate is increased after a relatively shorter time, and thus the period for increasing the current bit rate can be set as a short period (step S209).

It is described that steps S207 to S209 can be optional steps. That is, a single period for increasing the current bit rate can be set without setting a long period or a short period in the aforementioned embodiment. For example, if the determination result of step S203 is negative, step S210 is performed.

In step S210, the bit rate increasing unit 150 may determine whether the duration exceeds the period set by the bit rate recording unit 160. If so, step S211 is performed to increase the current bit rate. Otherwise, step S218 is performed to determine whether the current bit rate is between the maximum bit rate and the minimum bit rate, thereby generating the output bit rate by adjusting the current bit rate. Then, step S219 is performed, and the bit rate executing unit 170 may transmit the output bit rate to the video encoder 120.

In step S211, if the duration exceeds the period set by the bit rate recording unit 160, the step for increasing the current bit rate is performed (S212). In an embodiment, the bit rate increasing unit 150 may multiply the current bit rate with an increment ratio (e.g. the increment ratio can be 10%) to increase the current bit rate. Subsequently, step S212 is performed to determine whether the increased current bit rate is larger than the cordon bit rate.

In the embodiment, given that the current bit rate is 500K bytes/sec and the cordon bit rate is 3M bytes/sec, the increased current bit rate after step S211 is 500K bytes/sec* (1+10%)=550K bytes/sec (P1), wherein the level of the current bit rate is much smaller than the cordon bit rate 3M bytes/sec. Thus, if the determination result of step S212 is negative, step S218 is performed. If the increased current bit rate 550K bytes/sec is still between the maximum bit rate and the minimum bit rate, no changes are required and the output bit rate can be the increased current bit rate. Then, the video encoder 120 may perform video encoding according to the level of 550K bytes/sec, thereby achieving the functionality of increasing the current bit rate (e.g. the bit rate is increased to 550K bytes/sec at time t2 from 500K bytes/sec at time t1).

The aforementioned steps can be repeated to increase the current bit rate consistently until any of the event parameters occurs (step S204) or the current bit rate becomes larger than the cordon bit rate (step S212).

If the aforementioned steps are executed repeatedly to increase the current bit rate periodically to 2.1M bytes/sec (P2) at time t2 and an event flag of the event parameters rises, it may indicate that there is a bottleneck in the network, and the current network condition can not provide sufficient network bandwidth for the level of the current bit rate 2.1M bytes/sec. That is, issues such as freezed frame, mosaic-like block noise, network packet loss, video delay, asynchronization between video and acoustic signals, or frame dropping may happen. To prevent the aforementioned issues, step S204 is performed. First, the bit rate reducing unit 140 may set or define the level of the current bit rate as the cordon bit rate when any event flag of the event parameters is raised. For example, given that the current bit rate is 2.1M bytes/sec, the level of the cordon bit rate is reduced to 2.1M bytes/sec (C1) from 3M bytes/sec (C0), and then the current bit rate is also reduced. In an embodiment, the method for reducing the current bit rate is to multiply the current bit rate with a decrement ratio (e.g. 85%), and the reduced current bit rate can be 2.1M*85%=1.785M bytes/sec (P3), thus, to prevent the aforementioned issues from occurring. The purpose of setting or defining the cordon bit rate is to label the present level of bit rate 2.1M bytes/sec, and if the current bit rate 2.1M bytes/sec is used in the video conference, issues such as freezed frame, mosaic-like block noise, network packet loss, video delay, asynchronization between video and acoustic signals, or frame dropping may happen. The purpose for reducing the current bit rate is to prevent the aforementioned issues from happening or continuing when the aforementioned issues happen or have already happened at the present-level bit rate.

Subsequently, in step S205, the bit rate recording unit 160 may adjust the over cordon bit rate times and the number for increasing the cordon bit rate successfully. In an embodiment, the aforementioned adjusting operation indicates that the over cordon bit rate times and the number for increasing the cordon bit rate successfully are set to zero. The over cordon bit rate times and the number for increasing the cordon bit rate successfully are used when the network condition becomes better. Then, it is determined whether to update the cordon bit rate and the update amplitude to improve the video quality (the details will be described later). Subsequently, in step S206, the bit rate recording unit 160 may update the current bit rate (e.g. 1.785M bytes/sec), the cordon bit rate (e.g. 2.1M bytes/sec), the over cordon bit rate times (e.g. 0), and the number for increasing the cordon bit rate successfully (e.g. 0), store these parameters into the bit rate behavior storage unit 180, and execute step S207.

Specifically, in steps S206 to S211 of the aforementioned embodiment, the cordon bit rate is set to 2.1M bytes/sec in step S204, and the current bit rate is reduced to 1.785M bytes/sec (P3). In step S211, the current bit rate is increased again to 1.785M bytes/sec*1.1=1.9635 Mbytes/sec (P4). In step S212, it is determined whether the current bit rate is larger than the cordon bit rate. Meanwhile, the increased current bit rate is 1.9635 Mbytes/sec which is smaller than the cordon bit rate 2.1 Mbytes/sec, and step S218 is performed. If the increased current bit rate 1.9635 Mbytes/sec is between the maximum bit rate and the minimum bit rate, no change is required and the output bit rate can be the increased current bit rate. Then, the video encoder 120 may perform video encoding with the bit rate level 1.9635 Mbytes/sec.

Until now, the current bit rate was originally 2.1 Mbytes/sec (P2), and has been updated to 1.785 Mbytes/sec (P3) and subsequently to 1.9635M bytes/sec at time t4, so that the current bit rate can be reduced under the cordon bit rate 2.1M bytes/sec to prevent issues such as freezed frame, mosaic-like block noise, network packet loss, video delay, asynchronization between video and acoustic signals, or frame dropping.

Then, in the following repeated step S211, the current bit rate is again increased to 1.9635 Mbytes/sec*1.1=2.15985 Mbytes/sec (P5). In step S212, it is determined that the current bit rate 2.15985 Mbytes/sec is larger than the cordon bit rate 2.1 Mbytes/sec, and step S213 is performed to execute the following determination mechanism.

In the embodiment, since the cordon bit rate is the bit rate level set by the bit rate control apparatus 100 which may cause issues such as freezed frame, mosaic-like block noise, network packet loss, video delay, asynchronization between video and acoustic signals, or frame dropping. Accordingly, if the video encoder 120 performs video encoding at the level 2.1 Mbytes/sec, it is highly probable that the event parameters will occur. To avoid the aforementioned issues, the determination mechanism in step S213 and the following steps may ensure that the aforementioned issues do not occur while increasing the current bit rate.

First, in step S213, the bit rate recording unit 160 may increase the over cordon bit rate times. In an embodiment, the bit rate recording unit 160 may increase the over cordon bit rate times by 1. Then, in step S214, the bit rate recording unit 160 may further determine whether the over cordon bit rate times is larger than the over cordon bit rate times threshold. If so, step S216 is performed. Otherwise, step S215 is performed. In step S215, it may indicate that the over cordon bit rate times is smaller than the over cordon bit rate times threshold, and the bit rate executing unit 170 may reduce the current bit rate. In an embodiment, the bit rate executing unit 170 may reduce the current bit rate by dividing the current bit rate by the aforementioned increment ratio. That is, the divided current bit rate may be restored to the original current bit rate 1.9635 Mbytes/sec (P6) before the increment. In other words, if it is determined that the increased current bit rate will be larger than the cordon bit rate and the over cordon bit rate times is smaller than the over cordon bit rate times threshold, the present increment step is cancelled, so that the current bit rate can be kept under the cordon bit rate, but the invention is not limited to the aforementioned methods for reducing the current bit rate.

Specifically, the purpose of step S214 is to ensure that issues such as freezed frame, mosaic-like block noise, network packet loss, and video delay can be prevented when the network condition improves. Thus, it is determined that the network condition becomes better if the over cordon bit rate times is larger than a predetermined number (e.g. 3 times). To match the aforementioned conditions, there must no event parameter occur during the increment step for 3 consecutive times in the bit rate control apparatus 110, so that the present network condition can be determined as good and consistent, and thus the bit rate control apparatus 110 may try to increase the cordon bit rate and increase the current bit rate as well.

In the embodiment, when step S213 is performed for the first time, the over cordon bit rate times is increased to 1, and it may indicate that no event parameters occur during the present increment step (i.e. step S213 is only performed when no event parameter occurs). However, the duration (e.g. time t4 to t5) may be too short to determine whether the good network condition can be maintained. Since the network condition may become worse suddenly, the aforementioned issues, such as freezed frame, mosaic-like block noise, network packet loss, video delay, asynchronization between video and acoustic signals, or frame dropping, may occur if the current bit rate is increased too quickly. To prevent the aforementioned issues, the bit rate control apparatus 110 may adjust the increased current bit rate 2.15985 Mbytes/sec (step S211, P5) to the current bit rate 2.15985 Mbytes/sec/1.1=1.9635 Mbytes/sec, which is the current bit rate before the increment. Then, if the over cordon bit rate times is increased to 2, it may indicate that no event parameter occurs during the period of two consecutive increment steps (time t4 to t7). The current bit rate is again increased to 1.9635 Mbytes/sec*1.1=2.15985 Mbytes/sec (P7) when step S211 is again performed. Similarly, the bit rate control apparatus 110 may decrease the increased current bit rate to the bit rate 2.15985 Mbytes/sec/1.1=1.9635 Mbytes/sec, which is the current bit rate before the increment (step S215, P8), to prevent the aforementioned issues. Then, if the over cordon bit rate times is 3, it may indicate that no event parameter occurs during the period of three consecutive increment steps (time t4 to t9). The current bit rate is again increased to 1.9635 Mbytes/sec*1.1=2.15985 Mbytes/sec (P9) when step S211 is again performed. Similarly, the bit rate control apparatus 110 may still decrease the increased current bit rate to the bit rate 2.15985 Mbytes/sec/1.1=1.9635 Mbytes/sec, which is the current bit rate before the increment, to prevent the aforementioned issues. At last, if the over cordon bit rate times is 4 which exceeds the over cordon bit rate threshold 3, it may indicate that no event parameter occurs during the period of four consecutive increment steps (time t4 to t11), the bit rate control apparatus 110 may determine that the network condition may become consistently better, so that the bit rate control apparatus 110 may increase the cordon bit rate (step S217) and keep the increased current bit rate 2.15985 Mbytes/sec (without performing step S215, P11) to ensure the probability of occurrence of the issues being reduced while increasing the current bit rate. Meanwhile, the bit rate control apparatus 110 may set the over cordon bit rate times to zero (step S216) for counting in the following determination mechanism, and increase the number for increasing the cordon bit rate successfully by 1.

In step S217, the bit rate executing unit 170 may update the cordon bit rate according to a first equation, wherein the first equation can be expressed as follows:

$$cordon\_bit\_rate = cordon\_bit\_rate * (1 + R\_a * times\_to\_success\_increase)$$

wherein cordon_bit_rate indicates the cordon bit rate; R_a indicates an increment ratio; times_to_success_increase indicates the number for increasing the cordon bit rate successfully.

In the embodiment, if the ratio of increment (R_a) is 10% and this is the first time to increase the cordon bit rate successfully, the number for increasing the cordon bit rate times_to_success_increase is 1. Then, the cordon bit rate is adjusted to 2.1 Mbytes/sec*(1+10%*1)=2.1*1.1=2.31 Mbytes/sec (C2) from the level in C1, wherein the increment ratio is 10%.

In an embodiment, the present invention is not limited to the aforementioned equation to increase the cordon bit rate. The cordon bit rate can be increased by a fixed value or a fixed ratio, increased in an exponential way, or increased in other mathematical ways, but the invention is not limited thereto. In addition, the step to set the over cordon bit rate times to zero in step S216 can be executed in step S217.

Until now, the cordon bit rate has been increased to 2.31M bytes/sec (C2) from the level of 2.1M bytes/sec (C1) at time t2. The current bit rate was increased to 2.15985 Mbytes/sec (P11) from the level 1.9635 Mbytes/sec (P4). The increased current bit rate is still smaller than the increased cordon bit rate, thereby reducing the probability of the aforementioned issues taking place while increasing the current bit rate.

Within the same concept, when step S217 is again performed, the number for increasing the cordon bit rate times_to_success_increase is 2, it may indicate that no event parameter has occurred during the period between the present increment step S217 and the last increment step S217. In other words, the present network condition is good, and therefore the increment ratio can be increased to (10%*2). In the embodiment, in the present increment step S217, the cordon bit rate is increased to 2.31 Mbytes/sec*(1+10%*2)=2.31 Mbytes/sec*1.2=2.772 Mbytes/sec, thereby extending the margin for increasing the current bit rate to quickly provide better quality for the video conference.

If any event parameter occurs during the present increment step S217 and the last increment step S217, it may indicate that the network condition is unstable under the present current bit rate level. Thus, the over cordon bit rate times is set to zero in step S205. And then if step S216 is performed again, the number for increasing the cordon bit rate successfully is increased to 1. In other words, the ratio of increment for the cordon bit rate is limited (i.e. kept at 10%) to prevent the current bit rate from exceeding the load of the present network circumstances.

Then, step S218 is performed. The bit rate executing unit 170 may limit the current bit rate and the cordon bit rate between the maximum bit rate and the minimum bit rate. For example, if the current bit rate 2.15985 Mbytes/sec and the cordon bit rate 2.31 Mbytes/sec is larger than the maximum bit rate, the bit rate executing unit 170 may decrease the current bit rate and the cordon bit rate, so that the current bit rate and the cordon bit rate are between the maximum bit rate and the minimum bit rate. Similarly, if the current bit rate and the cordon bit rate is smaller than the minimum bit rate, the bit rate executing unit 170 may increase the current bit rate and the cordon bit rate, so that the current bit rate and the cordon bit rate are between the maximum bit rate and the minimum bit rate. In addition, if the current bit rate and the cordon bit rate are between the maximum bit rate and the minimum bit rate, no change is required.

At last, step S219 is performed. The adjusted current bit rate in step S218 can be defined as the output bit rate. The bit rate executing unit 170 may output the output bit rate and the cordon bit rate to the video encoder 120 and the bit rate recording unit 160, respectively.

In an embodiment, each module in the bit rate control apparatus 110 can be implemented by its own respective processor. Alternatively, all modules in the bit rate control apparatus 110 can be implemented by a single processor. In addition, the processor may also comprise a program, wherein the program can be read by the processor. The processor may execute the instructions within the program to implement the aforementioned functions.

In an embodiment, the increment ratio and the decrement ratio are independent, and a value can be set to the ratios according to practical needs or past experiences.

In view of the above, the method applied in the present invention uses various objective determination methods to test the stability of the encoding transmission. When the network bandwidth is sufficient and no event parameter occurs, the bit rate increasing unit 150 may increase the current bit rate, thereby ensuring that the current bit rate does not exceed the load of the present network while increasing the current bit rate. Therefore, the highest video stream bit rate can be achieved within the load of network bandwidth by repeatedly executing the aforementioned steps.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bit rate control apparatus, applied in a video conference system, the apparatus comprising:
    a bit rate recording unit, configured to update a current bit rate;
    a bit rate reducing unit, configured to receive at least one event parameter and the current bit rate, and determine whether an event flag corresponding to the event parameter occurs; and
    a bit rate increasing unit, configured to increase the current bit rate periodically,
    wherein when the event flag occurs, the bit rate reducing unit reduces the current bit rate.

2. The bit rate control apparatus as claimed in claim 1, wherein the bit rate recording unit is further configured to update a cordon bit rate, a number for increasing the cordon bit rate successfully, and over cordon bit rate times.

3. The bit rate control apparatus as claimed in claim 2, wherein the event parameter comprises a packet loss rate, a round-trip time, a buffer level signal, and a frame drop count signal.

4. The bit rate control apparatus as claimed in claim 3, wherein the bit rate reducing unit further determines whether four conditions exist:
   whether the packet loss rate is larger than a packet loss threshold;
   whether the round-trip time is larger than a round-trip time threshold;
   whether the buffer level signal is larger than a buffer level high threshold; and
   whether the frame drop count signal is larger than a frame drop count threshold;
   wherein if any one of the four conditions exists, the bit rate reducing unit determines that the event flag occurs.

5. The bit rate control apparatus as claimed in claim 2, wherein when the event flag occurs, the bit rate reducing unit further sets the current bit rate as the cordon bit rate, and then lowers the current bit rate.

6. The bit rate control apparatus as claimed in claim 5, wherein the bit rate increasing unit increases the current bit rate periodically, and if the increased current bit rate is larger than the cordon bit rate, the bit rate increasing unit further increases the over cordon bit rate times.

7. The bit rate control apparatus as claimed in claim 6, wherein the bit rate recording unit further determines whether the over cordon bit rate times is larger than a threshold;
   if so, the bit rate recording unit increases the number for increasing the cordon bit rate successfully;
   if not, the bit rate recording unit reduces the current bit rate.

8. The bit rate control apparatus as claimed in claim 7, wherein the step of increasing the cordon bit rate corresponds to the over cordon bit rate times.

9. The bit rate control apparatus as claimed in claim 1, further comprising:
   a bit rate behavior storage unit, configured to store the current bit rate,
   wherein when the bit rate control apparatus boots up, the bit rate recording unit sets the stored current bit rate as the current bit rate.

10. The bit rate control apparatus as claimed in claim 9, further comprising:
    a bit rate executing unit configured to limit the current bit rate between a maximum bit rate and a minimum bit rate.

11. A bit rate control method, applied in a bit rate control apparatus of a video conference system, the bit rate control apparatus comprising a current bit rate, a cordon bit rate, over cordon bit rate times, and a number for increasing the cordon bit rate successfully, the bit rate control apparatus performing the following steps of:
    receiving at least one event parameter;
    determining whether an event flag corresponding to the event parameter occurs;
    periodically increasing the current bit rate; and
    when the event flag occurs, reducing the current bit rate.

12. The bit rate control method as claimed in claim 11, wherein the event parameter comprises a packet loss rate, a round-trip time, a buffer level signal, and a frame drop count signal.

13. The bit rate control method as claimed in claim 12, wherein when any one of the following steps occurs, determining that the event flag occurs:
    determining whether the packet loss rate is larger than a packet loss threshold;
    determining whether the round-trip time is larger than a round-trip time threshold;
    determining whether the buffer level signal is larger than a buffer level high threshold; and
    determining whether the frame drop count signal is larger than a frame drop count threshold.

14. The bit rate control method as claimed in claim 11, wherein the step of reducing the current bit rate further comprises:
    setting the current bit rate as the cordon bit rate; and
    reducing the current bit rate.

15. The bit rate control method as claimed in claim 14, wherein the step of reducing the current bit rate further comprises:
    adjusting the number for increasing the cordon bit rate successfully and the over cordon bit rate times.

16. The bit rate control method as claimed in claim 15, wherein the step of periodically increasing the over cordon bit rate times further comprises:
    when the current bit rate is larger than the cordon bit rate, increasing the over cordon bit rate times.

17. The bit rate control method as claimed in claim 16, wherein the step of increasing the over cordon bit rate times further comprises:
    determining whether the over cordon bit rate times is larger than a threshold;
    if so, increasing the number for increasing the cordon bit rate successfully and increasing the cordon bit rate; and
    if not, reducing the current bit rate.

18. The bit rate control method as claimed in claim 17, wherein the step of increasing the cordon bit rate corresponds to the number for increasing the cordon bit rate successfully.

19. The bit rate control method as claimed in claim 11, further comprising:
    storing the current bit rate; and
    when the bit rate control apparatus boots up, utilizing the bit rate control apparatus to set the stored current bit rate as the current bit rate.

20. The bit rate control method as claimed in claim 19, further comprising:
    limiting the current bit rate between a maximum bit rate and a minimum bit rate.

* * * * *